United States Patent
Ootake et al.

[11] Patent Number: 5,958,542
[45] Date of Patent: Sep. 28, 1999

[54] THIN FILM MAGNETIC DISC AND METHOD OF MANUFACTURING THE DISC

[75] Inventors: Mitsuyoshi Ootake; Yuichi Kokaku, both of Yokohama; Yoshinori Honda, Hiratsuka; Akira Kato, Odawara; Hiroaki Hagimae, Chigasaki; Heigo Ishihara, Nishitama-gun; Kenji Furusawa, Hiratsuka, all of Japan

[73] Assignee: Hitachi, Ltd., Tokyo, Japan

[21] Appl. No.: 08/656,911

[22] Filed: Jun. 3, 1996

[30] Foreign Application Priority Data

Jun. 6, 1995 [JP] Japan ................................ 7-139368

[51] Int. Cl.⁶ ........................................................ G11B 5/66
[52] U.S. Cl. .................... 428/65.3; 428/65.4; 428/65.5; 428/141; 428/336; 428/694 T; 428/694 TP; 428/694 TC; 428/694 TR; 428/694 TF; 428/900; 427/130; 204/192.1; 204/192.16; 204/192.2; 204/192.32; 204/192.34; 204/192.35
[58] Field of Search .................................... 428/141, 336, 428/694 T, 694 TP, 694 TC, 694 TF, 694 TR, 900, 65.3, 65.4, 65.5; 427/130; 204/192.1, 192.16, 192.2, 192.32, 192.34, 192.35

[56] References Cited

U.S. PATENT DOCUMENTS

| | | | |
|---|---|---|---|
| 5,082,709 | 1/1992 | Suzuki | 428/65.4 |
| 5,316,844 | 5/1994 | Suzuki | 428/323 |
| 5,474,830 | 12/1995 | Yamaguchi | 428/141 |
| 5,637,393 | 6/1997 | Ueda | 428/332 |

FOREIGN PATENT DOCUMENTS

| | | |
|---|---|---|
| 1-258223 | 10/1989 | Japan . |
| 2-49281 | 2/1990 | Japan . |
| 2-143912 | 6/1990 | Japan . |

*Primary Examiner*—Leszek Kiliman
*Attorney, Agent, or Firm*—Fay, Sharpe, Beall, Fagan, Minnich & McKee

[57] ABSTRACT

A thin film magnetic disc in which dot-like scattered bumps, made of a material different from that of the protective layer, are formed on the protective layer, and a lubricant layer is formed on the surfaces of the protective layer and the scattered bumps. A protective layer excellent in strength and disk durability is obtained by using a material different from that of the bumps. The functions of the protective layer and scattered bumps are separated from each other and make full use of the different materials. Such a protective layer is effective to reduce spacing between a head and the disc.

16 Claims, 12 Drawing Sheets

44 WEAR RESISTANT LAYER

FIG. 12e

6 SCATTERED MASKING PARTICLES

3 PROTECTIVE LAYER

5 LUBRICANT

THIN FILM MAGNETIC DISC AND METHOD OF MANUFACTURING THE DISC

BACKGROUND OF THE INVENTION

The present invention relates to a thin film magnetic disc for a magnetic disc memory used as an external memory such as a computer, work station or personal computer and a method of manufacturing the thin film magnetic disc, and particularly to a thin film magnetic disc including a protective layer having an excellent disc durability and a method of manufacturing the thin film magnetic disc.

In recent years, there has been a need for to increase the capacity of a magnetic disc to hold information, as well as a need to reduce the size and weight of a magnetic disk memory. To make both the needs compatible with each other, it is essential to significantly improve the recording density of a magnetic disc as a recording medium. Current magnetic discs mainly are constructed of a sputtered thin film type in which a chromium under layer, a cobalt alloy magnetic layer and a carbon protective layer are formed by sputtering on a nonmagnetic substrate composed of a nickel-phosphorus plated aluminum based alloy and wherein the surface of the protective layer is coated with a lubricant. In such a sputtered thin film magnetic disc, it is necessary to make narrower a spacing between a recording film of the magnetic disc and a head for realizing a higher density. To satisfy this need, the thickness of the protective layer is required to be made thin in order to lower a flying height of the head. The thinning of the protective layer, however, presents disadvantages in lowering disc durability and reliability and also in making difficult a stable running of a head at a low flying height.

One means for solving such disadvantages has been proposed in Japanese Patent Laid-open Nos. Hei 1-258223 and Hei 2-143912, wherein a protective layer is formed of two carbon layers which are different from each other in film property.

The above noted means, however, have proven to be insufficient because the total film thickness of the protective layer formed of two carbon layers is made thick, causing a spacing loss between a head and a magnetic layer. One means for reducing a spacing loss is described in Japanese Patent Laid-open No. Hei 2-49281, which is intended to ensure the strength of a contact portion with a head and to reduce an effective film thickness. The thinning of the protective layer at a recessed portion, however, allows scratches to be easily generated due to hard dust, which tends to generate corrosion and finally to cause head crush. As a result, in the related art thin film magnetic discs, it has been difficult to reduce the thickness of a protective layer to a value of 10 nm or less, and also to obtain an excellent design of disc durability for some materials of the protective layer because of incompatibility between wear resistance and lubricant adsorption of the materials.

SUMMARY OF THE INVENTION

In view of the foregoing, an object of the present invention is to provide a thin film magnetic disc which prevents generation of scratches due to dust or the like even when a thin protective layer is utilized for reducing a spacing loss between a head and a magnetic layer and which is excellent in supply of lubricant for a portion being brought in intermittent-contact with the head and which has excellent corrosion resistance.

To achieve the above object, according to a preferred mode of the present invention, there is provided a thin film magnetic disc including a nonmagnetic substrate, a magnetic layer formed on the nonmagnetic substrate and a protective layer formed on the magnetic layer. Dot-like scattered bumps made of a material different from that of the protective layer are formed in such a manner as to integrally project from the surface of the protective layer, and a lubricant layer is formed on surfaces of the protective layer and the scattered bumps.

The protective layer is preferably made of a material excellent in dust resistance, moisture resistance, and lubricant adsorption. The dot-like scattered bumps formed in such a manner as to project from the surface of the protective layer preferably are made of a material which is excellent at least in disc durability and which is soft enough to prevent generation of scratches of the protective layer due to dust generated by abrasion of the material of the bumps.

According to another preferred mode of the present invention, there is provided a method of manufacturing a thin film magnetic disc including the steps of: forming a magnetic layer on a nonmagnetic substrate; forming a protective layer and a scattered bump forming layer on the magnetic layer; making particles as a mask adhere in a scattered or spared fashion on the surface of the scattered bump forming layer; and etching the scattered bump forming layer using the particles as the mask, thereby leaving masked portions of the scattered bump forming layer as dot-like scattered bumps and exposing the protective layer from the portions, other than the scattered bumps, of the scattered bump forming layer.

According to a further preferred mode of the present invention, there is provided a method of manufacturing a thin film magnetic disc including the steps of: forming a magnetic layer on a nonmagnetic substrate; forming a scattered bump forming layer on the magnetic layer; making particles as a mask adhere in a scattered or spared fashion on the surface of the scattered bump forming layer; etching the scattered bump forming layer using the particles as the mask, thereby forming scattered bumps; and forming a protective layer on the surface of the magnetic layer or on an intermediate surface of the scattered bump forming layer which is exposed by the etching.

The thin film magnetic disc of the present invention can be designed to be excellent in disc durability by the combination of the protective layer with the scattered bumps. Namely, the material of the protective layer can be selected to be excellent not only in resistance against dust and corrosion but also in lubricant adsorption, thereby sufficiently supplying lubricant to a sliding portion, and the material of the scattered bumps can be selected to be excellent in disc durability and to be softer than that of the protective layer for preventing generation of scratches of the protective layer due to dust generated by abrasion of the scattered bumps. A spacing between a head and the disc can be thus reduced by separating the materials, that is, the functions of the protective layer and the scattered bumps from each other, thereby making full use of the materials.

DETAILED DESCRIPTION OF THE PREFERRED EMBODIMENTS

Hereinafter, thin film magnetic discs of the present invention will be described by way of examples with reference to the drawings.

Figure 1:
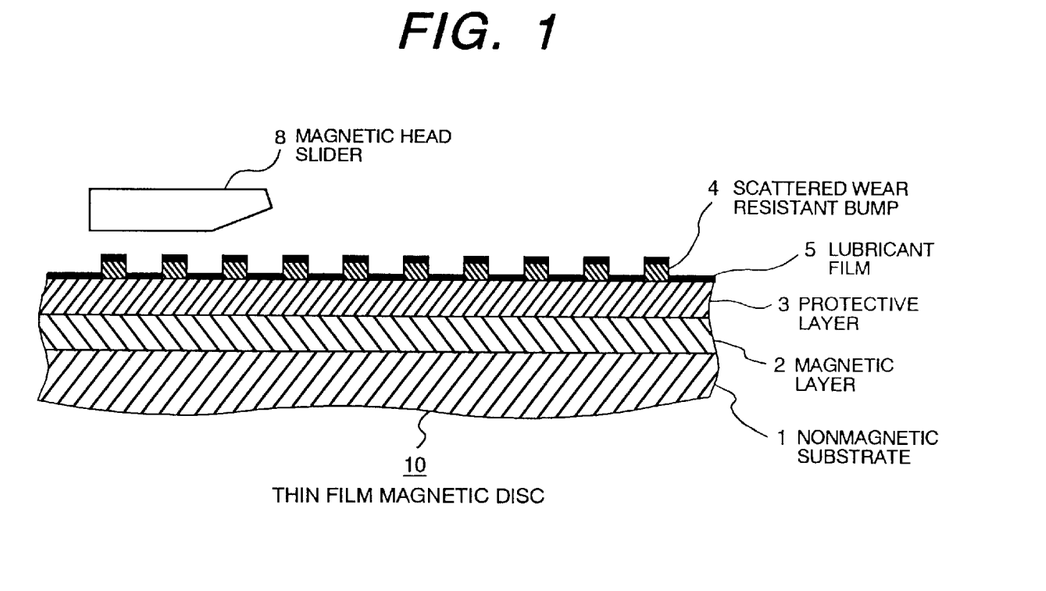
FIG. 1 is a sectional view showing a structure of a thin film magnetic disc of a first example of the present invention.

FIG. 1 shows a magnetic disc memory using a thin film magnetic disc of a first example of the present invention. Referring to FIG. 1, a magnetic head slider 8 slightly flies over a thin film magnetic disc 10 upon rotation of the disc 10.

As shown in FIG. 1, the thin film magnetic disc 10 of the present invention includes a protective layer 3 and dot-like scattered bumps 4 which characterize by the present invention. Specifically, the protective layer 3 is formed on a magnetic layer 2 formed on a nonmagnetic substrate 1, and the scattered bumps 4 are formed in a randomly spaced fashion on the protective layer 3. Then, the upper surfaces of the protective layer 3 and the scattered bumps 4 are coated with a lubricant 5. The protective layer 3 is made of a material selected from a group consisting of DLC (Diamond Like Carbon), $SiO_2$, $TiO_2$ and $ZrO_2$, and the scattered bumps 4 are made of a material which is different from that of the protective layer 3, with the material being selected from the above group consisting of DLC (Diamond Like Carbon), $SiO_2$, $TiO_2$ and $ZrO_2$.

The DLC layer may be either of a carbon layer containing hydrogen which is formed by CVD (Chemical Vapor Deposition), an amorphous a carbon layer, carbon layer containing hydrogen or a carbon layer containing nitrogen which is formed by sputtering.

The film property of the above-described DLC layer is specified as follows. The CVD carbon preferably has a composite elastic coefficient of from 200 to 300 GPa, and a Raman intensity ratio of from 0.3 to 0.7. It is to be noted that the Raman intensity ratio is determined by separating a spectrum measured by Raman spectroscope into two peaks by a Gaussian method and taking the intensity ratio between the main peak near 1580 cm$^{-1}$ and the peak near 1380 cm$^{-1}$, that is, $I_{1580}/I_{1380}$ as the Raman intensity ratio. The sputtered carbon preferably has a composite elastic coefficient of from 80 to 120 GPa and a Raman intensity ratio of from 0.9 to 1.5. The sputtered carbon containing hydrogen preferably contains hydrogen in an amount of from 10 to 35 atomic %; and the sputtered carbon containing nitrogen preferably contains nitrogen in an amount of from 10 to 35%.

Various combinations of the materials of the protective layer with the materials of the scattered bumps are possible. In particular, the protective layer 3 may be made of $SiO_2$, $TiO_2$, $ZrO_2$, CVD carbon or sputtered carbon containing nitrogen in terms of corrosion resistance in an operating environment, and it may be made of SiC, CVD carbon, or sputtered carbon containing nitrogen in terms of dust resistance. On the other hand, the scattered bumps 4 may be made of sputtered carbon, sputtered carbon containing hydrogen, CVD carbon, SiC or $SiO_2$ in terms of disc durability. In this case, when the protective layer 3 is made of one kind selected from these materials, that is, sputtered carbon, sputtered carbon containing hydrogen, CVD carbon, SiC and $SiO_2$, the scattered bumps 4 are made of one of the other materials because the function of the scattered bumps 4 should be different from that of the protective layer 3. The optimum combination of the materials based on the total evaluation of the thin film magnetic disc is one using the protective layer made of CVD carbon and the scattered bumps 4 made of sputtered carbon or sputtered carbon containing hydrogen. This combination is simple and also easy in handling because the protective layer 3 and the scattered bumps 4 are each made of substantially the same element, that is, a carbon based element; and it is also excellent in adhesiveness between the protective layer 3 and the scattered bumps 4 and do not cause a failure due to a combination of different elements. Moreover, CVD carbon used for the protective layer 3 is higher in hardness than sputtered carbon and is excellent in coverage against surface roughness so that it is excellent in dust resistance and corrosion resistance. Morever, it has many dangling bonds based on the structure of the CVD layer and thereby is high in lubricant adsorption. Sputtered carbon used for the scattered bumps 4 is excellent in disc durability, and is softer than CVD carbon so that dust possibly generated by abrasion of the sputtered carbon does not damage the protective layer 3. In addition, the portion of the scattered bumps 4 may not be hard and have a suitable hardness in terms of wear of a head; however, the selection of the material for the scattered bumps 4 is preferably determined in consideration of the conformability to the head material.

Table 2 shows the effect of the present invention using various combinations of the film materials of the scattered bumps and protective layer as compared with Combination No. 1 (Comparison) in which scattered bumps and a protective layer are made of sputtered carbon.

As is seen from Table 2, Combination Nos. 2 to 8 exhibit excellent effects in terms of one to three characteristics as compared with Combination No. 1 (Comparison).

TABLE 2

Combinations of the materials of the scattered bumps and protective layer and relative effect thereof

| Combination No. | Film Material | | Relative Advantages | | | | | |
|---|---|---|---|---|---|---|---|---|
| | Scattered bumps | Protective layer | Etching Resistance | Corrosion Resistance | Scratch Reduction | Bump Wear Resistance | Lubricant Adsorption | Head Wear Resistance |
| 1 (Comparison) | F10 | F10 | 1 | 1 | 1 | 1 | 1 | 1 |
| 2 | F10/ F21 | F23 | 2 | 3 | 3 | 1 | 3 | 2 |
| 3 | F10/ F22 | F22 | 2 | 2 | 1 | 1 | 2 | 2 |
| 4 | F10/ F21 | F31/ F32 | 3 | 3 | 3 | 1 | 1 | 2 |
| 5 | F10/ F21 | F33/ F34/ F35 | 3 | 3 | 2 | 1 | 1 | 2 |
| 6 | F22/ F23 | F10/ F21 | 1 | 1 | 1 | 2 | 1 | 1 |
| 7 | F32 | F10/ F21 | 1 | 1 | 1 | 3 | 1 | 1 |
| 8 | F33/ F34/ F35 | F10/ F21 | 1 | 1 | 1 | 3 | 1 | 1 |

*Where the above Film Materials are shown by respective Nos. of the list below.

List of Film Materials

| No. | Film Material | Film Property |
|---|---|---|
| F10 | Sputtered carbon | Amorphous carbon layer having a composite elastic coefficient of from 80 to 120 GPa and a Raman intensity ratio (I1580 cm$^{-1}$/I1380 cm$^{-1}$ exciting Ar ion laser 5145Å) of from 0.9 to 1.5. |
| F21 | Sputtered carbon containing hydrogen | DLC (Diamond Like Carbon) layer containing hydrogen in an amount of from 10 to 35 atomic %. |
| F22 | Sputtered carbon containing nitrogen | DLC layer containing nitrogen in an amount of from 10 to 35%. |
| F23 | CVD carbon | DLC layer having a composite elastic coefficient of from 200 to 300 GPa and a Raman intensity ratio of from 0.3 to 0.7. |
| F31 | Carbon containing Si | Sputtered layer containing Si in an amount of from 10–20 atomic %. |
| F32 | SiC | Sputtered layer |
| F33 | SiO$_2$ | Sputtered layer |
| F34 | TiO$_2$ | Sputtered layer |
| F35 | ZrO$_2$ | Sputtered layer |

A second example of the present invention will be described below with reference to FIG. 2.

Figure 2:
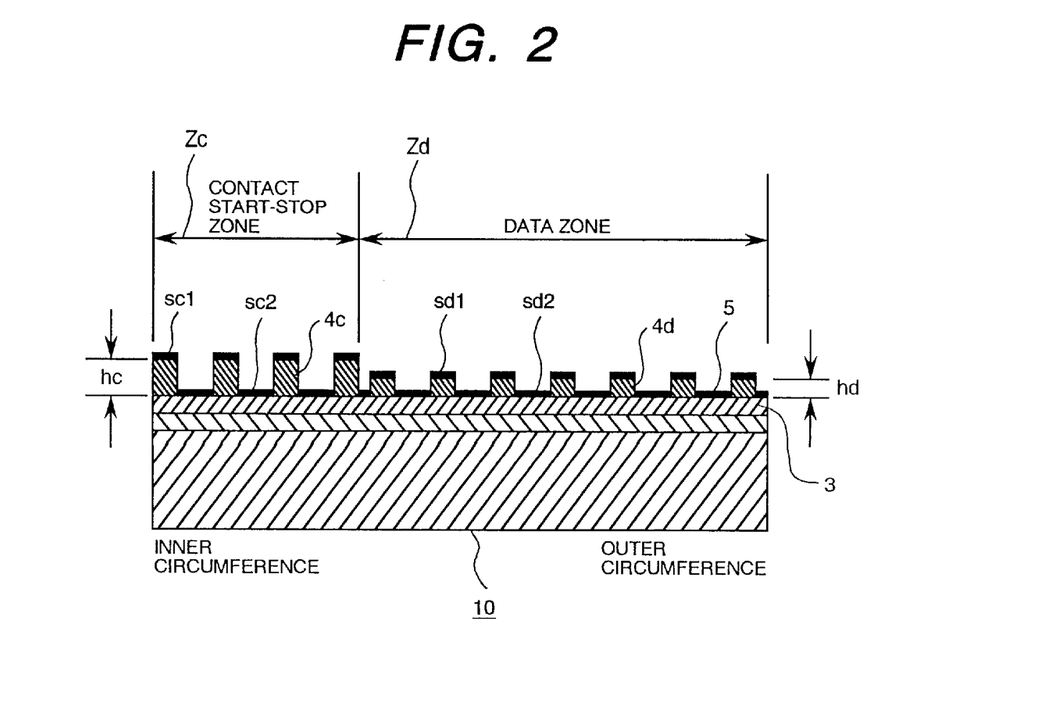
FIG. 2 is a sectional view showing a structure of a thin film magnetic disc of a second example of the present invention.

A thin film magnetic disc 10 shown in FIG. 2 is so constructed that a protective layer 3 and scattered bumps 4 are made of the same materials as those of the first example shown in FIG. 1; however, the scattered bumps 4 have different features in shape and distribution. In general, a magnetic disc is divided into a CSS (Contact Start-Stop) zone Zc and a data zone Zd. The CSS zone Zd is provided on the inside diameter side of the disc, into which a head is returned when the relation of the magnetic disc is started and stopped. The data zone Zd is provided on the outside of the CSS zone Zc, from/to which the head reads/writes data. In the example shown in FIG. 2, the scattered bumps 4 are divided into scattered bumps 4c in the CSS zone Zc and scattered bumps 4d in the data zone Zd which are different from each other in height and distribution.

A bump area ratio D is generally expressed by an equation of D=S1/(S1+S2) where S1 is the total surface area of the scattered bumps 4 and S2 is the total surface area of portions, other than the scattered bumps 4, of the protective layer 3. The thin film magnetic disc in this example enables high reliability and high recording density by specifying the bump area ratio in the CSS zone Zc on the inside diameter side of the disc, Dc=Sc1/(Sc1+Sc2) to be in a range of from 0.5 to 50% for reducing adhesiveness with a head and increasing durability, and also specifying the bump area ratio in the data zone Zd, Dd=Sd1/(Sd1+Sd2) to be in a range of from 0 to 25% for lowering the flying height of the head.

In addition, the scattered bump area ratio Dc in the CSS zone is required to be larger than the bump area ratio Dd, and a height hc of the scattered bumps 4c in the CSS zone is required to be substantially equal to or larger than a height hd of the scattered bumps 4d in the data zone (hc≈hd or hc>hd)

The bump area ratio Dc in the CSS zone is preferably in a range of from 1 to 5% and the bump area ratio Dd in the data zone is preferably in a range of from 0 to 2%, in terms of low adhesiveness and low flying.

Figure 3:
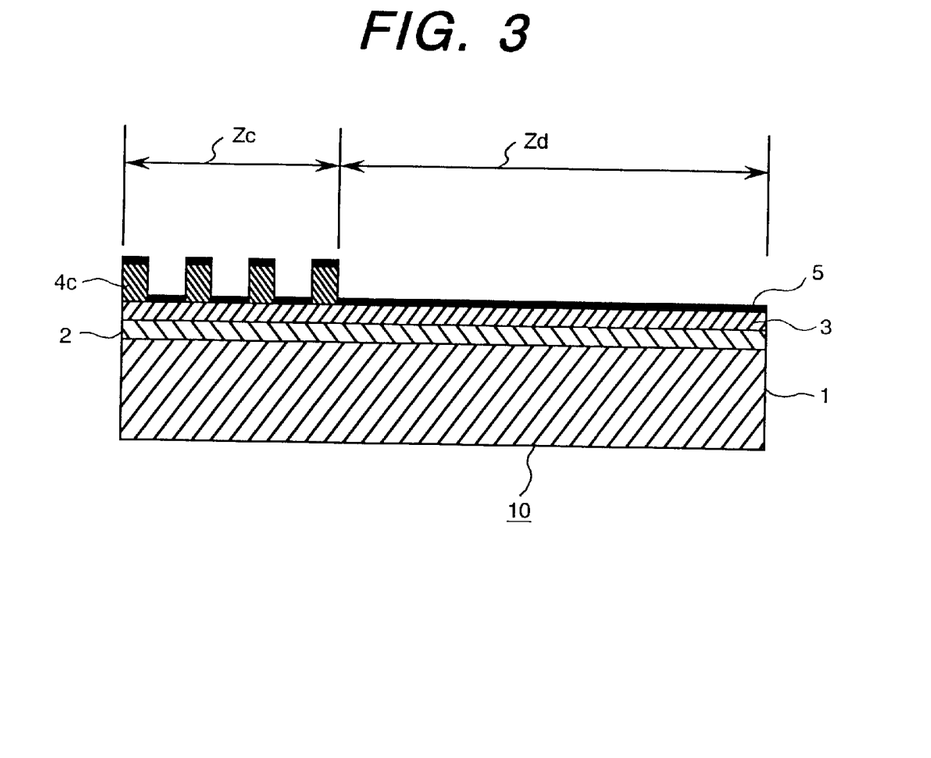
FIG. 3 is a sectional view showing a structure of a thin film magnetic disc of a third example of the present invention.

When the bump area ratio Dd in the data zone Zd is 0%, the scattered bumps 4c are present in the CSS zone Zc; however, the scattered bumps 4d are not present in the data zone Zd, as shown in the third example shown in FIG. 3. The scattered bumps 4d are required somewhat for reducing contamination of a head and reducing adhesiveness of the head upon assembly; however, the scattered bumps 4d are not required if such inconveniences are solved by a different means.

The size of the scattered bumps 4 will be described below. The size of the scattered bump 4 is preferably in a range of from 0.05 to 3 μm (in terms of the complete round) in consideration of adhesiveness between a head and a disc.

Figure 4:
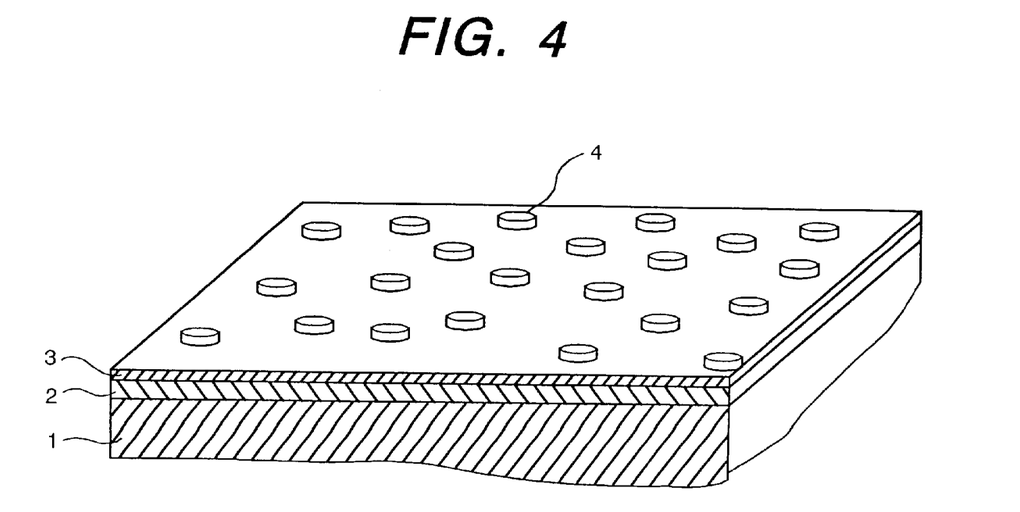
FIG. 4 is a perspective view showing a state in which scattered bumps in the first example of the present invention are distributed.
Figure 5:
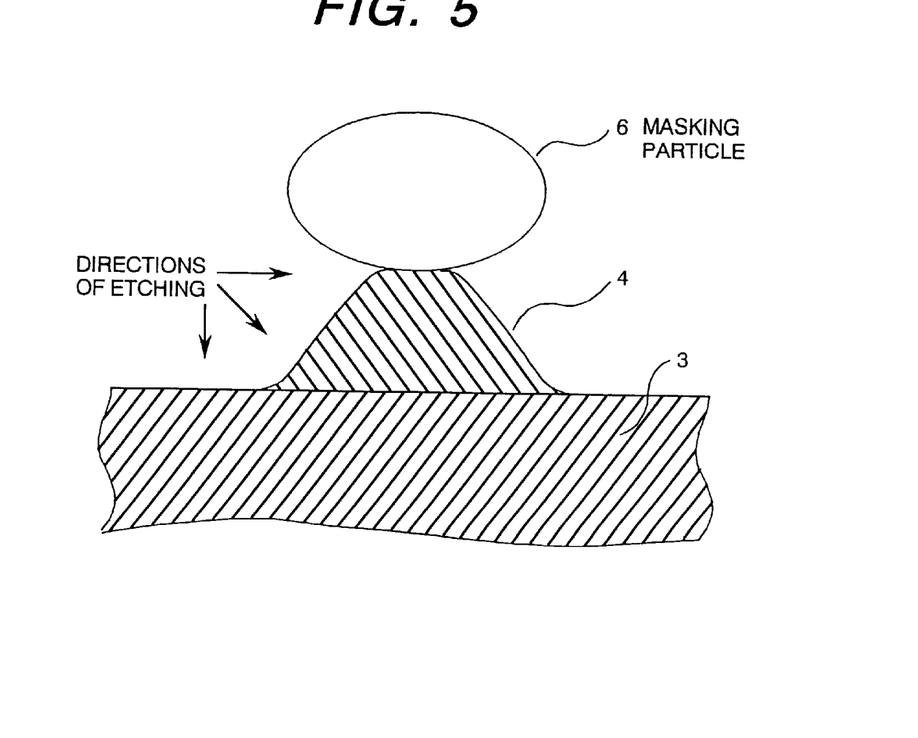
FIG. 5 is an enlarged sectional view showing a shape of a scattered bump after etching.

The number of the scattered bumps 4 per unit area is determined depending on a relationship between the size of the scattered bumps 4 and bump area ratio. For example, the number of the scattered bumps 4 is about $4.2 \times 10^7$ pieces/$cm^2$ when the bump area ratio is 3% and the size of the scattered bump 4 is 0.3 μm; and is about $3.8 \times 10^6$ pieces/$cm^2$ when the bump area ratio is 3% and the size of the scattered bump 4 is 1 μm. The scattered bumps 4 may be distributed at random as shown in FIG. 4. The height of the scattered bumps 4 exerts a large effect on the flying height of a head. For example, when the height of a scattered bumps 4 is 15 nm, the flying height of 30 nm or less can be obtained. However, when the height of the scattered bumps 4 is less than 5 nm, the adhesiveness between the head and disc becomes larger, and accordingly, the height of the scattered bumps 4 is preferably set at 5 nm or more. The thickness of the protective layer 3 is preferably set at 5 nm or more in both the CSS and data zones for preventing generation of scratches of the protective layer 3 due to dust. In addition, the scattered bump 4 is formed into a trapezoid shape smoothly and evenly spread downward from the lower side of the particle 6 because etching advances equidistantly in all directions. The shape of the scattered bump 4, however, does not exert any effect on the above description.

Figure 6:
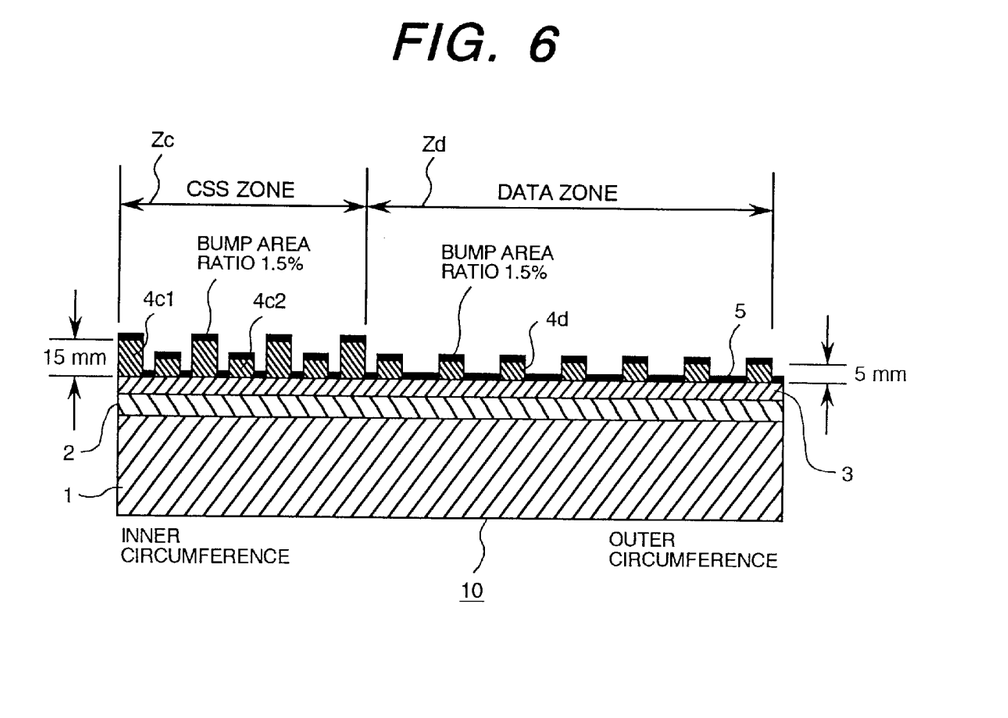
FIG. 6 is a sectional view of a structure of a thin film magnetic disc of a fourth example of the present invention.

FIG. 6 shows a thin film magnetic disc 10 of a fourth example of the present invention. In this example, scattered bumps 4c1 and 4c2 in the CSS zone Zc are so specified that a bump height hc1=15 nm and a bump area ratio Dd1=1.5% while a bump height hc2=5 nm and bump area ratio Dd2= 1.5%. On the other hand, scattered bumps 4d in the data zone Zd are so specified that a bump height hd=5 nm and a bump area ratio Dd=1.5%. The bump heights in the CSS zone Zc having two different heights of 15 nm and 5 nm are generated in association with manufacturing processes. These different heights do not exert a large effect on the flying characteristic except that the flying reference surface of the head is slightly raised.

Figure 7:
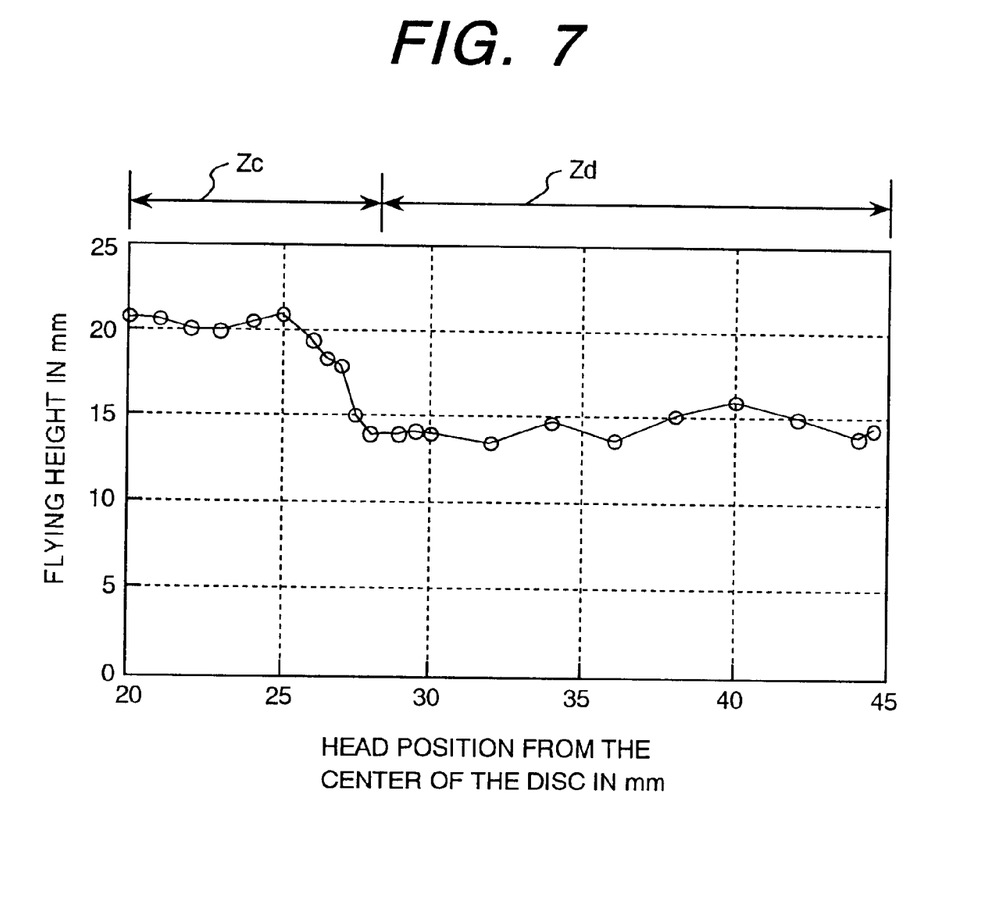
FIG. 7 is a graph showing a flying characteristic of a head in the fourth example of the present invention.

FIG. 7 shows a flying characteristic of the magnetic disc 10 shown in FIG. 6. As seen from this graph, the flying height in the data zone Zd is lower than that in the CSS zone Zc by 5 nm or more. Namely, wear resistance is excellent in the CSS zone Zc because the scattered bumps 4c1 and 4c2 are higher; while a spacing between the head and magnetic layer can be reduced in the data zone Zd because the scattered bumps 4d are lower. Since data are not recorded in the CSS zone Zc, the height of the scattered bumps can be so designed as to obtain an excellent CSS resisting characteristics. In addition, in the example shown in FIG. 6, the protective layer 3 is made of CVD carbon, and the scattered bumps 4 are made of sputtered carbon.

Figure 10:
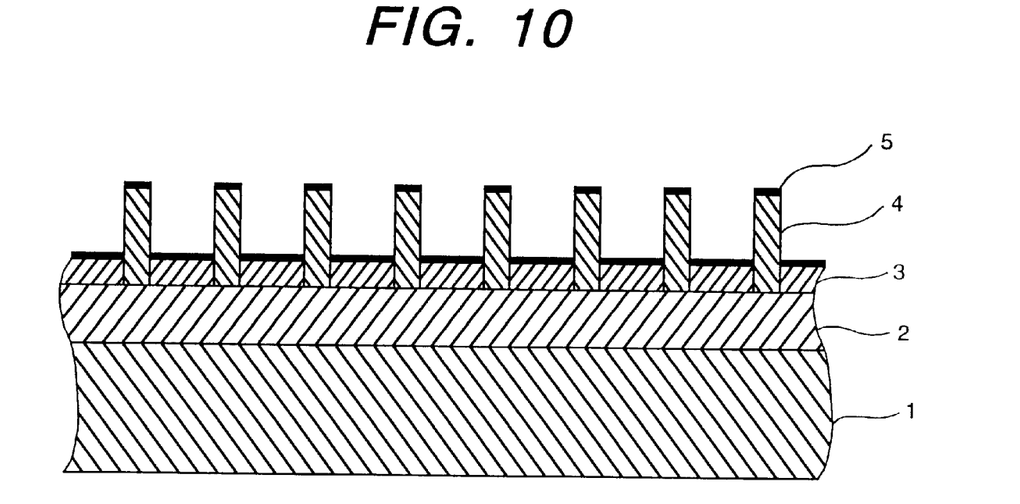
FIG. 10 is a sectional view showing a structure of a thin film magnetic disc of a fifth example of the present invention.

A fifth example of the present invention will be described below with reference to FIG. 10. In this example, a protective layer 3 and scattered bumps 4 are made of the same materials as those in the example shown in FIG. 1; however, the scattered bumps 4 are formed on a magnetic layer 2. Namely, in this disc 10, since the scattered bumps 4 are directly formed on the magnetic layer 2, the adhesive strength of the scattered bumps 4 is increased. This makes it possible to prevent the scattered bumps 4 from being separated from the disc 10 due to the contact between a head 8 and the scattered bumps 4 upon CSS or the like. Also, since the protective layer 3 is formed after etching, the surface of the protective layer 3 is not subjected to the chemical/physical damage due to etching, thus eliminating degradation of disc durability.

Figure 11:
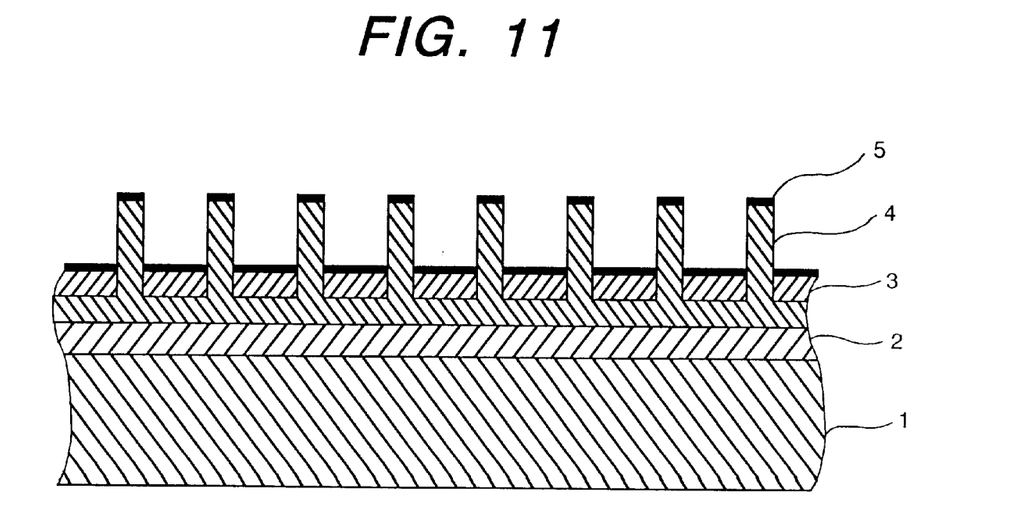
FIG. 11 is a sectional view showing a structure of a thin film magnetic disc of a sixth example of the present invention.
Figure 12A:
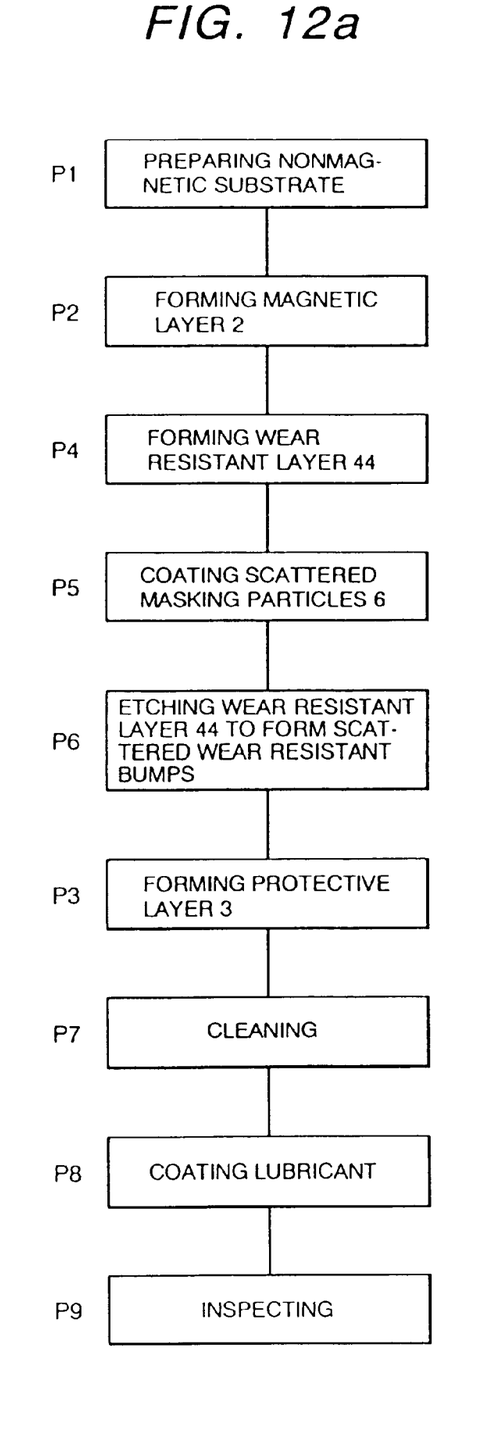
FIG. 12(a) is a process diagram showing the process steps of manufacturing the thin film magnetic disc of the fifth example of the present invention.
Figure 12B:
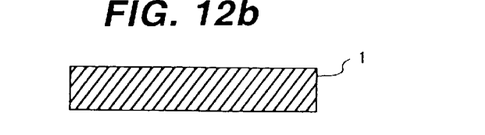
FIG. 12(b) is a diagram showing respective sectional structures of the disc at each process step shown in FIG. 12(a).
Figure 12C:
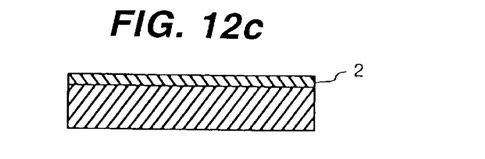
Figure 12D:
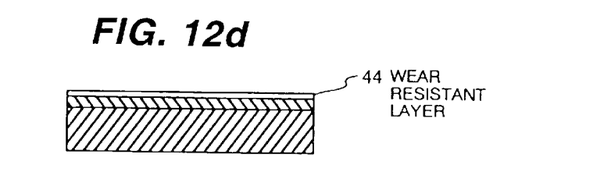
Figure 12E:
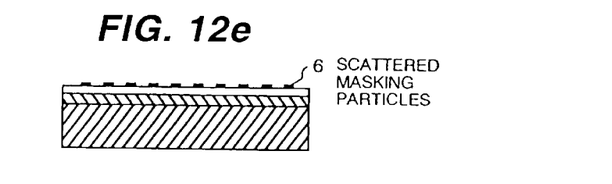
Figure 12F:
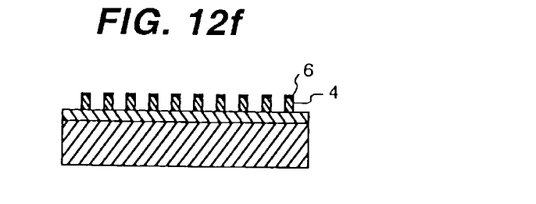
Figure 12G:
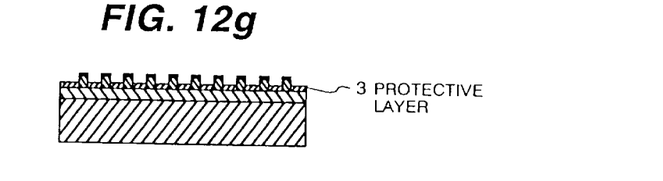
Figure 12H:
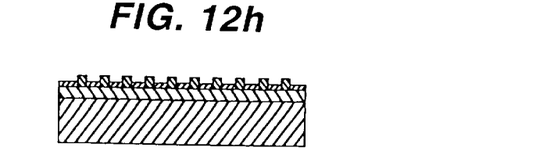
Figure 12I:
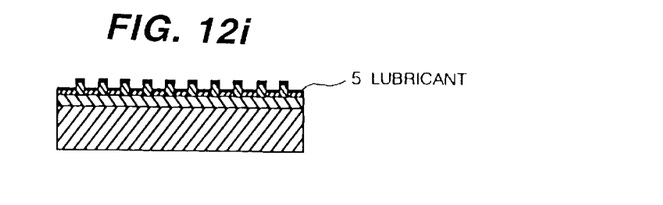

If the adhesive strength of the scattered bumps 4 is required to be increased more, it is desirable that the base portions of the scattered bumps, which are adhesively bonded to the magnetic layer, are made to be continuous with each other as shown in a sixth example of FIG. 11. In this case, the protective layer 3 is continuously formed, except for the scattered bumps 4. In this example, the protective layer 3 and the scattered bumps 4 may be formed of the same materials as those in the first example. Also, the disc 10 in each of the fifth and sixth examples may have the same sectional structure as that in each of the second, third and fourth examples.

Next, a method of manufacturing the thin film magnetic disc of the first example of the present invention will be described with reference to FIGS. 8(a) and 8(b).

Figure 8A:
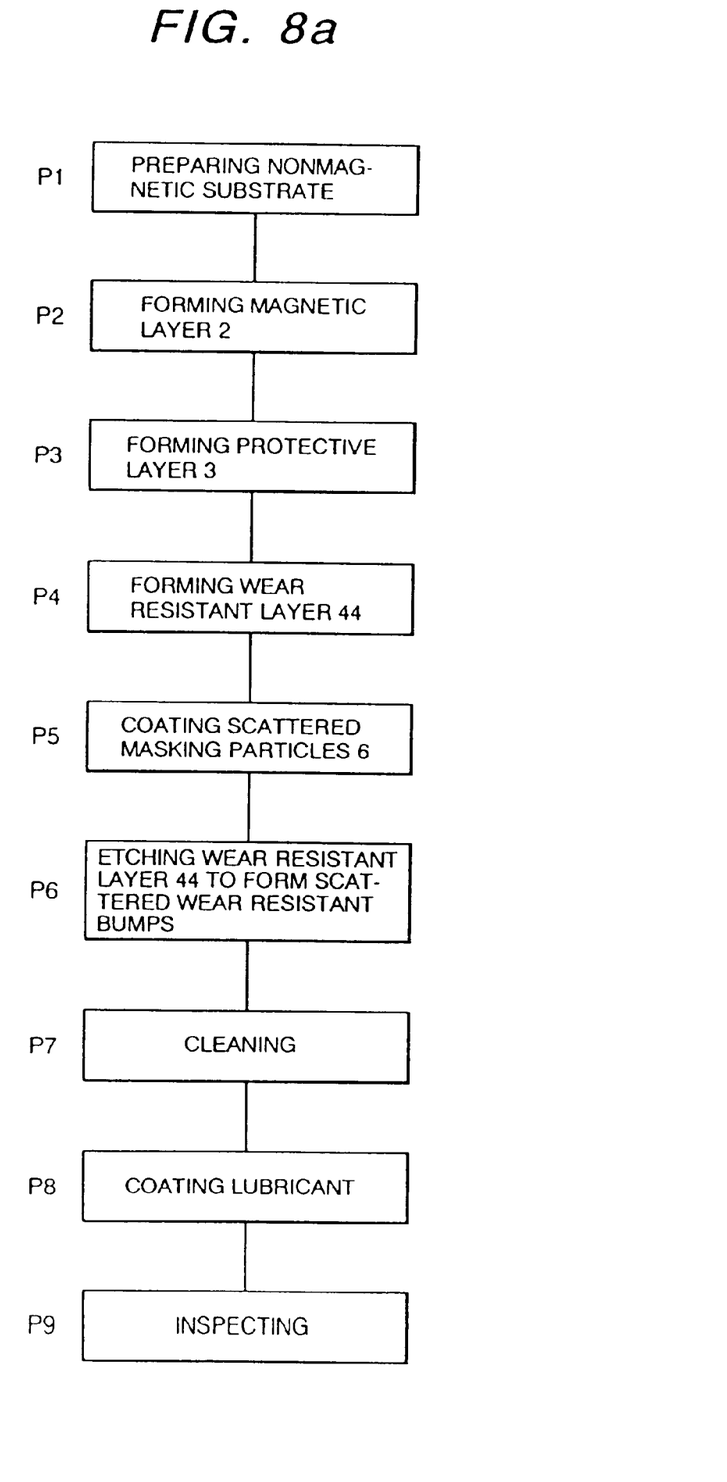
FIG. 8(a) is a process diagram showing the process steps of manufacturing the thin film magnetic disc of the first example of the present invention.
Figure 8B:
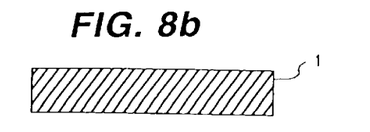
FIG. 8(b) is a diagram showing respective sectional structures of the disc at each process step shown in FIG. 8(a)
Figure 8C:
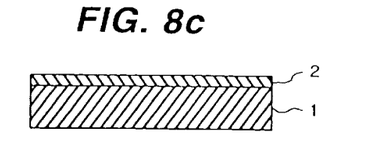
Figure 8D:
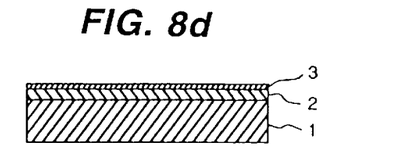
Figure 8E:
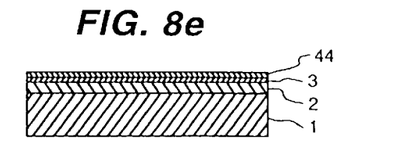
Figure 8F:
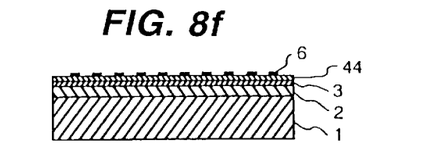
Figure 8G:
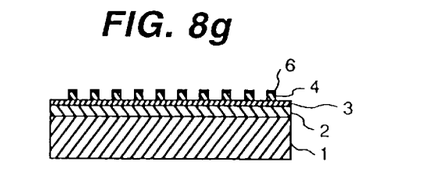
Figure 8H:
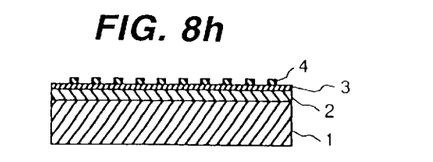
Figure 9A:
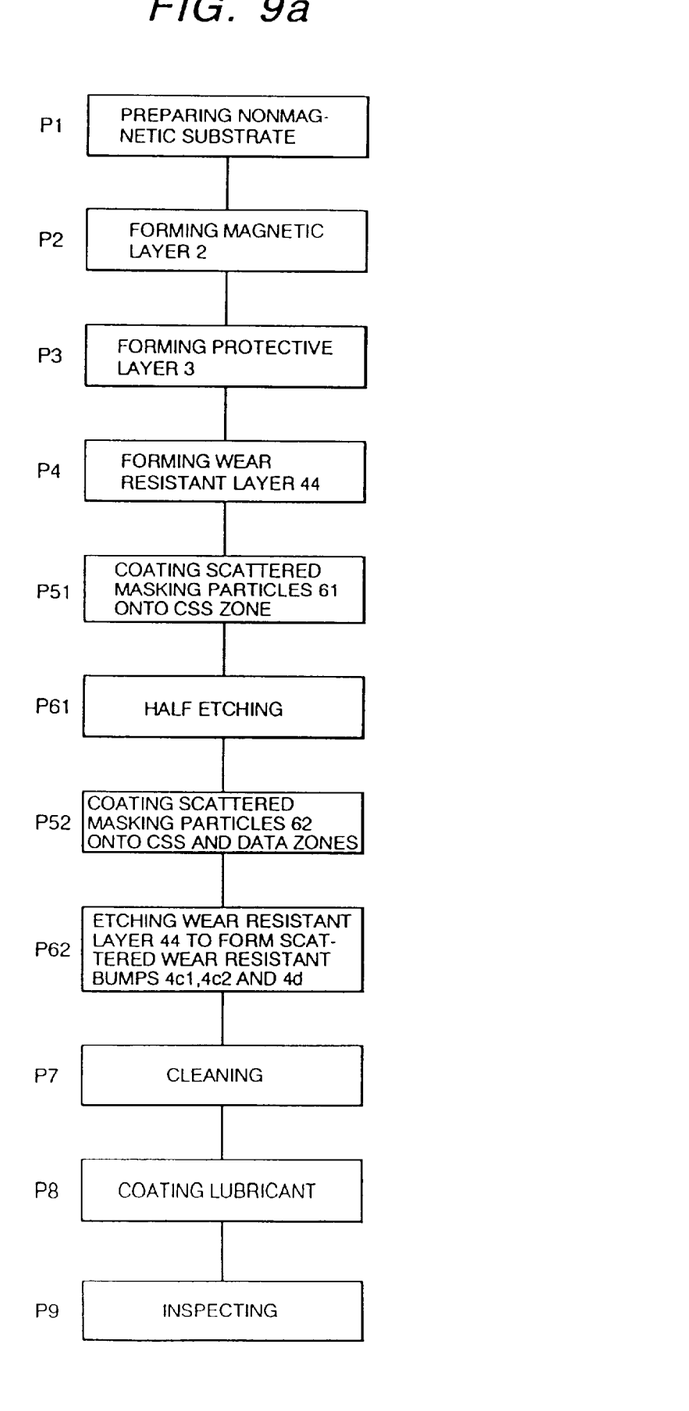
FIG. 9(a) is a process diagram showing the process steps of manufacturing the thin film magnetic disc of the fourth example of the present invention.
Figure 9B:
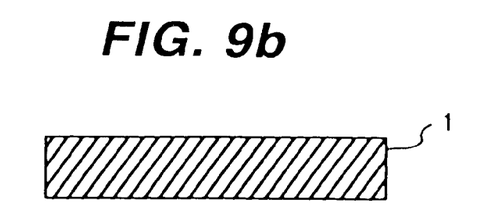
FIG. 9(b) is a diagram showing respective sectional structures of the disc at each process step shown in FIG. 9(a)
Figure 9C:
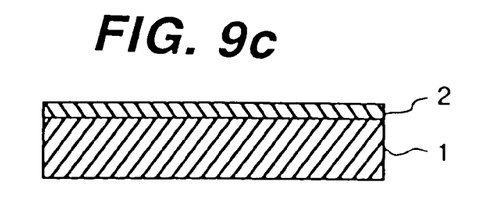
Figure 9D:
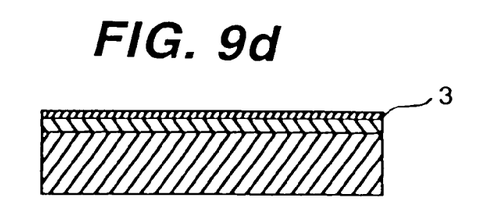
Figure 9E:
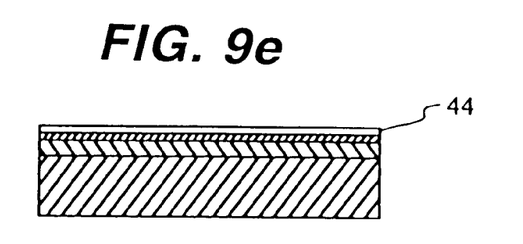
Figure 9F:
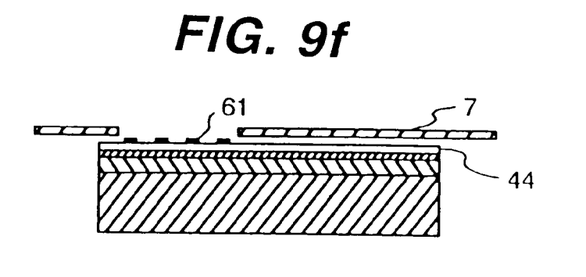
Figure 9G:
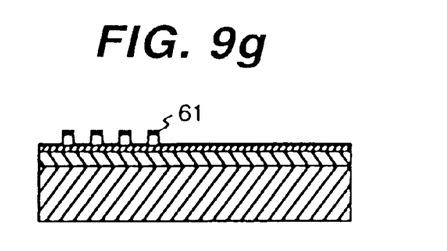
Figure 9H:
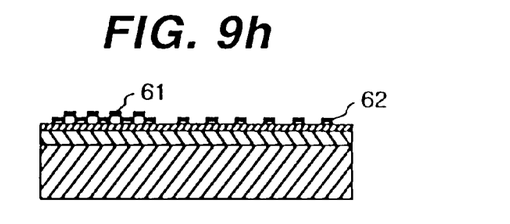
Figure 9I:
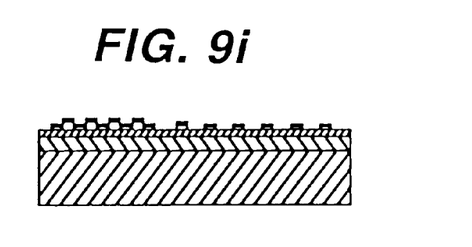
Figure 9J:
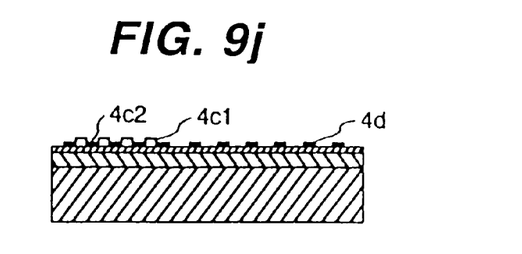
Figure 9K:
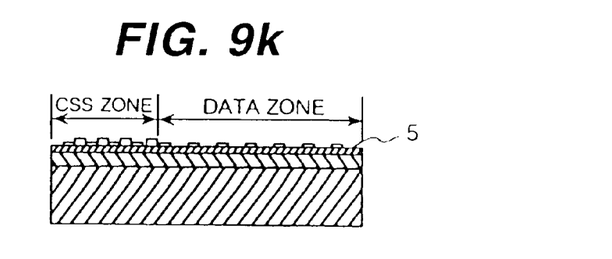

FIG. 8(a) is a process diagram showing process step for manufacturing the thin film magnetic disc of the first example shown in FIG. 1; and FIG. 8(b) is a diagram showing respective sectional structures of the disc at the process steps shown in FIG. 8(a).

First, a nonmagnetic substrate 1 is prepared at a process step P1. Subsequently, a cobalt alloy magnetic layer 2 is formed on the substrate 1 by sputtering at a process step P2, and a protective layer 3 is formed on the magnetic layer 3 at a process step P3.

A scattered bump forming layer 44 is formed of a thin film material on the protective layer 3 at a process step P4, and particles 6 are applied on the scattered bump forming layer 44 at a process step P5. Then, at a process step P6, portions, on which the particles 6 do not adhere, of the scattered bump forming layer 44 are etched to a thickness reaching the surface of the protective layer 3, to form scattered bumps 4.

The particles 6 are removed at a process step P7, and the surfaces of the protective layer 3 and the scattered bumps 4 are coated with a lubricant 5 at a process step P8, thus completing the manufacturing processes. The thin film magnetic disc thus obtained is then inspected in terms of flying characteristic, read/write characteristic and the like at a process step P9.

The manufacturing process step shown in FIG. 8(a) are basic process step for manufacturing the thin film magnetic disc in the first example. A texture process for imparting a magnetic orientation may be inserted before the process step P2. A tape cleaning process for removing refuse and projections generated at the preceding processes may be inserted before the process step P8.

The nonmagnetic substrate 1 may be formed of a nickel-phosphorus aluminum based alloy or a glass plate. An under layer made of chromium, chromium-titanium is preferably formed under the magnetic layer 2 for improving magnetic characteristics.

A method of forming materials used for the protective layer 3 and the scattered bumps 4 will be described below.

CVD carbon is formed by RF sputtering or ECR sputtering using as a source material a hydrocarbon such as $CH_4$, $C_2H_6$, $C_3H_8$, $C_2H_4$ or $C_6H_6$. Sputtered carbon is formed by DC sputtering using a discharge gas of Ar. Sputtered carbon containing hydrogen is formed by DC sputtering or RF sputtering using a discharge gas of Ar with a hydrocarbon added such as $CH_4$ or hydrogen in an amount of from 5 to 40%. Similarly, sputtered carbon containing nitrogen is formed by sputtering using a discharge gas of Ar with nitrogen added in an amount of from 5 to 40%. The use of a gas added with hydrogen or nitrogen, however added, has a danger that an insulator is deposited on a carbon target and a foreign matter is generated from the target by abnormal discharge, and consequently, RF sputtering is desirable. Similarly, an insulating material such as SiC, $SiO_2$, $TiO_2$ or $ZrO_2$ is formed by RF sputtering.

The particles 6 as a mask at the process step P5 in FIG. 8(*a*) will be described. The particle size is preferably in a range of from 0.05 to 3 μm in terms of the complete round and a bump area ratio per unit area is preferably in a range of from 0.5 to 10%. The material of the particles is selected from inorganic materials such as $SiO_2$, $Al_2O_3$, $CaCO_3$, $MgCO_3$, $CeO_2$ and carbon, and polymers such as PTFE, polystyrene and polybutadiene. In particular, PTFE (polytetrafluoroethylene) is desirable in terms of removal of the particles. The particles 6 advantageously are made to adhere on an objective surface by atomizing a liquid dispersed with the particles 6 by spraying or ultrasonic wave, applying a high voltage to the particles in a floating state in which the dispersing liquid is volatilized thereby charging the particles 6, and making the particles 6 adhere on the objective surface by electrostatic charge. In the case of atomizing the dispersing liquid by spraying, it becomes possible to form liquid droplets each having a diameter of 10 μm or less using a two-liquid nozzle and hence to improve the dispersion/adsorption.

At the process step P6 shown in FIG. 8(*a*), at least one or more of the gases $O_2$, Ar, $N_2$ or mixed gas thereof may be used as the etching gas. In particular, in the case of using $N_2$, a thin insulating layer containing nitrogen as a sub-product of the etching is formed on the surface of carbon, to thereby improve the film property of the protective layer 3.

At the process step P6 shown in FIG. 8(*a*), the etching of a single surface is desirable because the simultaneous etching of both surfaces causes an etching distribution due to the fact that the substrate is held. If the simultaneous etching of both the surfaces is adopted to enhance productivity, the etching distribution can be reduced using a material being low in etching rate or being not etched. Table 1 shows the etching rates of sputtered carbon, CVD carbon and Si in the case of using oxygen as an etching gas.

TABLE 1

| Etching Rate of Protective Layer | |
|---|---|
| protective layer | etching rate (nm/sec) |
| sputtered carbon | 1.59 |
| CVD carbon | 0.85 |
| Si(*) | 0 |

Condition
kind of gas: oxygen
gas pressure: 0.3 Torr
RF power: 50 W
both surface etching
(*)reacts with oxygen into $SiO_2$ As seen from Table 1, Si is not etched by oxygen at all, and thereby it is desirable as an etching stopper. At this time, a dense $SiO_2$ is formed on the etching surface, which is desirable for the protective layer 3. In addition, the etching rate of CVD carbon is nearly half that of sputtered carbon, and thereby it may be also used as the etching stopper. SiC, $SiO_2$, $TiO_2$ or $ZrO_2$ may also used as the etching stopper.

FIG. 9(*a*) is a process diagram showing process steps for manufacturing the thin film magnetic disc of the fourth example shown in FIG. 6; and FIG. 9(*b*) is a diagram showing respective sectional structures of the disc at the process steps shown in FIG. 9(*a*). These manufacturing process steps are different from those shown in FIGS. 8(*a*) in that the particle applying process and the etching process are repeated twice. Specifically, these process steps include a particle applying process step P51 for applying partial particles 61 and a first etching process step P61 for etching a scattered bump forming layer 44 for the CSS zone; and a particle applying process step P52 for applying particles 62 and a second etching process step P62 for etching the scattered bump forming layer 44 for the CSS and data zones. Other process step, that is, process step P1, P2, P3, P4, P7, P8 and P9 are the same as those shown in FIG. 8(*a*). In addition, the residue of the scattered bump forming layer 44 after etching is set to be equal to the height of the scattered bumps 4*d* in the data zone Zd at the first etching process step P61.

According to the manufacturing method shown in FIG. 9(*a*), the height of the scattered bumps in the data zone Zd is made smaller than that in the CSS zone Zc, and thereby a spacing between a head and a recording layer can be reduced. In addition, the thin film magnetic disc of the third example shown in FIG. 3 can be manufactured by omitting the process step P61 and P52 from the manufacturing process step shown in FIG. 9(*a*).

FIG. 12(*a*) is a process diagram showing process step for manufacturing a thin film magnetic disc of the fifth example of the present invention; and FIG. 12(*b*) is a diagram showing respective sectional structures of the disc at the process steps shown in FIG. 12(*a*). These manufacturing process steps are different from those shown in FIG. 8(*a*) in that a scattered bump forming layer 44 is formed after a cobalt system alloy magnetic layer 2 is formed, and a particle applying process step P5, an etching process step 6 and a protective layer forming process step 3 are sequentially performed. The other process steps, that is, the process steps P1, P2, P7, P8 and P9 are the same as those shown in FIG. 8(*a*). In addition, the thin film magnetic disc of the sixth example shown in FIG. 11 can be manufactured by stopping, on the way, the etching for portions on which the particles do not adhere, that is, the scattered bump forming layer 4 at the etching process step P6.

The method of the manufacturing the thin film magnetic disc of the present invention thus provides a thin film magnetic disc which prevents the protective layer 3 from is cracked due to dust generated by abrasion, being excellent in corrosion resistance and disc durability, and enables low flying of a head. Also, since the protective layer serves as an etching stopper, the heights of the scattered bumps can be made uniform, thus reducing the thickness of the protective layer to be 10 nm or less.

As described above, the thin film magnetic disc of the present invention can be designed to be excellent in disc durability by the combination of a protective layer with scattered bumps. Namely, the material of the protective layer can be selected to be excellent not only in resistance against dust and corrosion but also in lubricant adsorption, thereby sufficiently supplying lubricant to a sliding portion, and the material of the scattered bumps can be selected to be excellent in disc durability and to be softer than that of the protective layer for preventing generation of scratches of the protective layer due to dust generated by abrasion of the scattered bumps.

A spacing between a head and the disc can be thus reduced by separating the materials, that is, the functions of the protective film and the scattered bumps from each other, thereby making full use of the materials thereof.

What is claimed is:

1. A thin film magnetic disc comprising:
   a nonmagnetic substrate;
   a magnetic layer formed on said nonmagnetic substrate;
   a protective layer formed on said magnetic layer;

scattered bumps made of a material different in physical characteristics from that of said protective layer, which are formed integrally with said protective layer in such a manner as to project from the surface of said protective layer; and a lubricant layer formed on surfaces of said protective layer and said scattered bumps, wherein said protective layer has a thickness of 10 nm or less and is made of a material selected from a group consisting of DLC, SiC, $SiO_2$, $TiO_2$ and $ZrO_2$, and said scattered bumps are made of a material selected from a group consisting of DLC, SiC, $SiO_2$, $TiO_2$ and $ZrO_2$, the selected material from the group for the bumps being a different material from the selected material for the protective layer.

2. A thin film magnetic disc comprising:

a nonmagnetic substrate;

a magnetic layer formed on said nonmagnetic substrate;

a protective layer formed on said magnetic layer;

scattered bumps made of a material different in physical characteristics from that of said protective layer, which are formed integrally with said protective layer in such a manner as to project from the surface of said protective layer; and a lubricant layer formed on surfaces of said protective layer and said scattered bumps, wherein said protective layer is formed of a DLC layer, said DLC layer being made of either CVD carbon having a composite elastic coefficient of from 200 to 300 Gpa and a Raman intensity ratio, determined by separating a spectrum measured by Raman spectroscope into two peaks by a Gaussian method and taking the intensity ratio between the main peak near 1580 $cm^{-1}$ and the peak near 1380 $cm^{-1}$ as the Raman intensity ratio, of from 0.3 to 0.7 or sputtered carbon containing nitrogen in an amount of from 10 to 35 atomic %; and said scattered bumps are formed of a DLC layer, said DLC layer being made of either sputtered carbon having a composite elastic coefficient of from 80 to 120 Gpa and a Raman intensity ratio of from 0.9 to 1.5 or sputtered carbon containing hydrogen in an amount of from 10 to 35 atomic %.

3. A thin film magnetic disc comprising:

a nonmagnetic substrate;

a magnetic layer formed on said nonmagnetic substrate;

a protective layer formed on said magnetic layer;

scattered bumps made of a material different in physical characteristics from that of said protective layer, which are formed integrally with said protective layer in such a manner as to project from the surface of said protective layer; and a lubricant layer formed on surfaces of said protective layer and said scattered bumps, wherein a ratio of the surface area of said scattered bumps to the total surface area of said protective layer and said scattered bumps is less than 25% in a data zone of said disc; and the ratio is larger in the contact start-stop zone of said disc than that in the data zone.

4. A thin film magnetic disk according to claim 1, wherein said scattered bumps are formed on said protective layer.

5. A thin film magnetic disk according to claim 1, wherein said scattered bumps are formed on said magnetic layer.

6. A thin film magnetic disc accordingly to claim 1, wherein said thin film magnetic layer disc further comprises an intermediate layer made of the same material as that of said scattered bumps, which is interposed between said protective layer and said magnetic layer, and said scattered bumps are formed so as to project from said intermediate layer.

7. A thin film magnetic disc according to claim 2, wherein said scattered bumps are formed on said protective layer.

8. A thin film magnetic disc according to claim 2, wherein said scattered bumps are formed on said magnetic layer.

9. A thin film magnetic disc according to claim 2, wherein said thin film magnetic disc further comprises an intermediate layer made of the same material as that of said scattered bumps, which is interposed between said protective layer and said magnetic layer, and said scattered bumps are formed so as to project from said intermediate layer.

10. A thin film magnetic disc according to claim 3, wherein said scattered bumps are formed on said protective layer.

11. A thin film magnetic disc according to claim 3, wherein said scattered bumps are formed on said magnetic layer.

12. A thin film magnetic disc according to claim 3, wherein said thin film magnetic disc comprises an intermediate layer made of the same material as that of said scattered bumps, which is interposed between said protective layer and said magnetic layer, and said scattered bumps are formed so as to project from said intermediate layer.

13. A method of manufacturing a thin film magnetic disc including a nonmagnetic substrate, a magnetic layer formed on said nonmagnetic substrate and a protective layer formed on said magnetic layer, comprising the steps of:

forming said magnetic layer on said nonmagnetic substrate;

forming said protective layer on said magnetic layer;

forming a scattered bump forming layer made of a material different from that of said protective layer on said magnetic layer;

adhering particles scatteredly on said scattered bump forming layer and etching said scattered bump forming layer, using said particles as a mask, to a thickness reaching the surface of said protective layer to form scattered bumps;

removing said particles used as the mask; and applying a lubricant on the surfaces of said protective layer and said scattered bumps.

14. A method of manufacturing a thin film magnetic disc according to claim 13, wherein the etching rate of said protective layer is higher than that of said scattered bump forming layer.

15. A method of manufacturing a thin film magnetic disc including a nonmagnetic substrate, a magnetic layer formed on said nonmagnetic substrate and a protective layer formed on said magnetic layer, comprising the steps of:

forming said magnetic layer on said nonmagnetic substrate;

forming a scattered bump forming layer made of material different from that of said protective layer on said magnetic layer;

adhering particles scatteredly on said scattered bump forming layer and etching said scattered bump forming layer, using said particles as a mask, to a thickness reaching the surface of said magnetic layer to form scattered bumps;

forming said protective layer on the surface, except for said scattered bumps, of said magnetic layer removing said particles used as the mask; and applying a lubricant on the surface of said protective layer and said scattered bumps.

16. A method of manufacturing a thin film magnetic disc including a nonmagnetic substrate, a magnetic layer formed on said nonmagnetic substrate and a protective layer formed on said magnetic layer, comprising the steps of:

forming said magnetic layer on said nonmagnetic substrate;

forming a scattered bump forming layer made of a material different from that of said protective layer on said magnetic layer;

adhering particles scatteredly on said scattered bump forming layer and etching said scattered bump forming layer using said particles as a mask, to a thickness halfway to said magnetic layer to form scattered bumps;

forming said protective layer on the surface except for said scattered bumps, of said scattered bump layer etched;

removing said particles used as the mask; and applying a lubricant on the surfaces of said protective layer and said scattered bumps.

* * * * *